United States Patent [19]
Thompson

[11] Patent Number: 5,294,060
[45] Date of Patent: Mar. 15, 1994

[54] MATERIAL SPREADER

[75] Inventor: Peter G. Thompson, Avon Lake, Ohio

[73] Assignee: Lesco, Inc., Rocky River, Ohio

[21] Appl. No.: 901,793

[22] Filed: Jun. 22, 1992

[51] Int. Cl.[5] .......................... A01C 7/16; A01C 17/00
[52] U.S. Cl. .................... 239/656; 239/687; 222/145
[58] Field of Search ............ 239/656, 681, 687; 222/145

[56] References Cited

U.S. PATENT DOCUMENTS

| | | | |
|---|---|---|---|
| 3,184,108 | 5/1965 | Grau | 222/145 |
| 3,221,903 | 12/1965 | Van Geen | 222/145 |
| 4,609,151 | 9/1986 | Crowley | 239/656 |

FOREIGN PATENT DOCUMENTS 211468  7/1984  Fed. Rep. of Germany ...... 239/656

*Primary Examiner*—Andres Kashnikow
*Assistant Examiner*—Lesley D. Morris
*Attorney, Agent, or Firm*—Tarolli, Sundheim & Covell

[57] ABSTRACT

A material spreader includes a support frame and a pair of ground engaging wheels for rollingly supporting the frame. A hopper is attached to the support frame and includes first and second isolated chambers for holding first and second materials, respectively, to be spread. A first series of discharge openings in the bottom of the first chamber allows material to be discharged from the first chamber. A second series of discharge openings in the bottom of the second chamber allows material to be discharged from the second chamber. Slide valves are operable to selectively independently control the flow of material through the first and second series of discharge openings. A series of passages in a distribution manifold interconnect the first and second series of discharge openings. Each passage is isolated from the other passages and has two inlets and one outlet. One of the inlets to each passage is in the first series of discharge openings and the other one of the inlets to each passage is in the second series of discharge openings. The outlets of the passages discharge material onto an impeller.

19 Claims, 6 Drawing Sheets

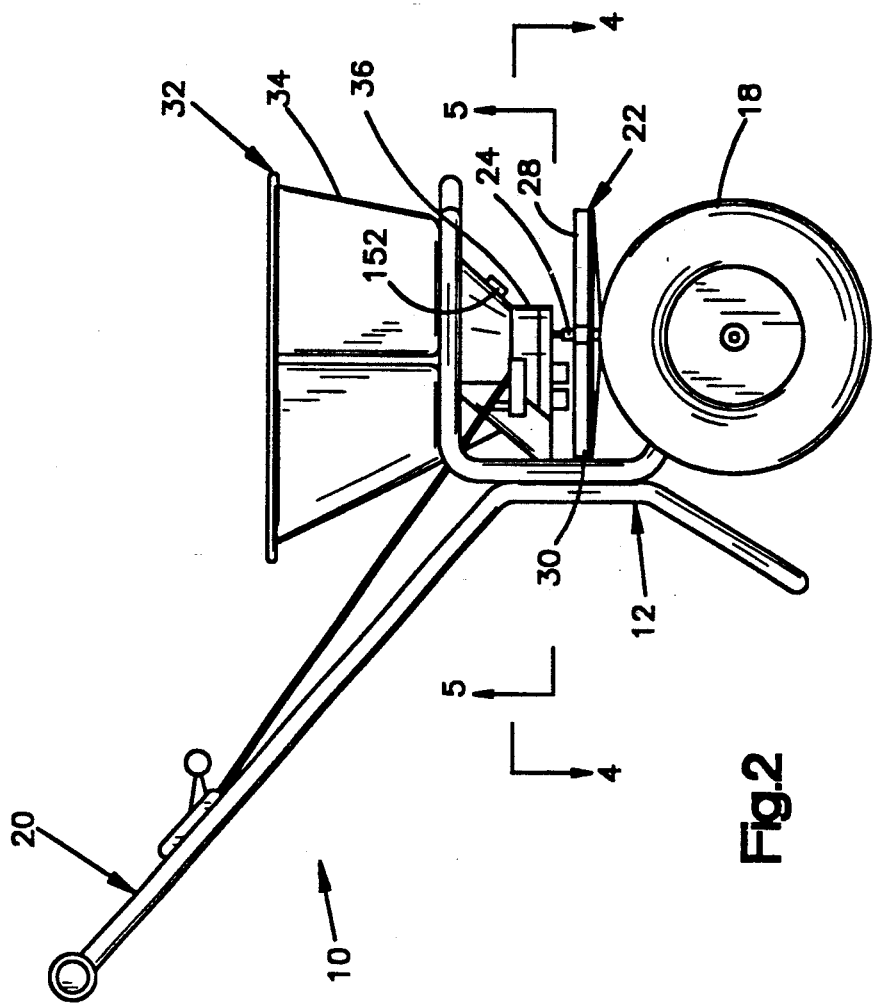
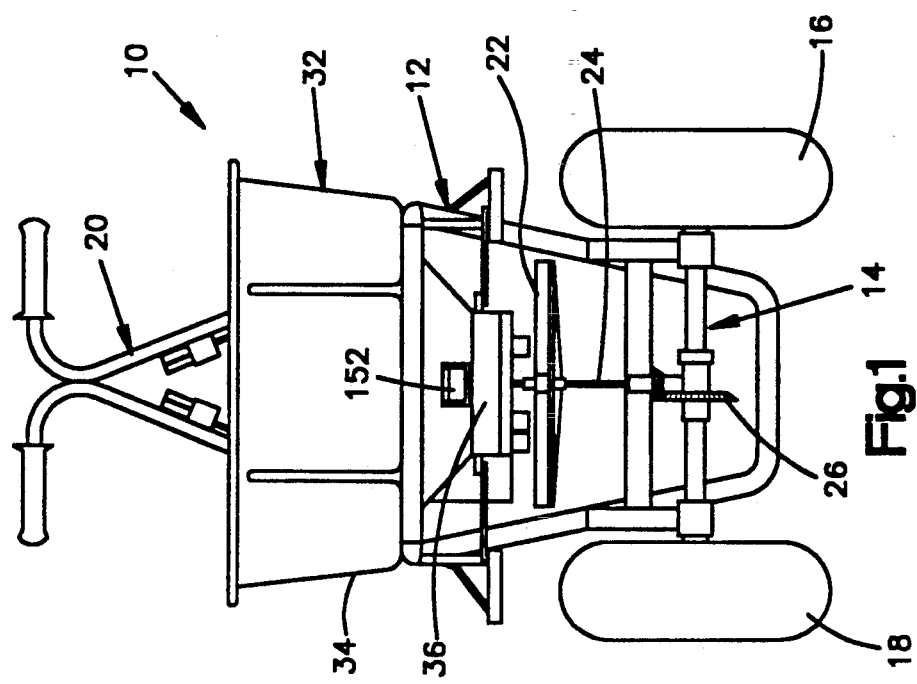
Fig.2
Fig.1

MATERIAL SPREADER

BACKGROUND OF THE INVENTION

1. Technical Field

The present invention relates to a material spreader, and more particularly to a spreader such as a lawn spreader which can simultaneously spread two different materials.

2. Description of the Prior Art

U.S. Pat. No. 4,609,151 to Crowley discloses a material spreader having multiple compartments and a mixer. The material from the compartments is discharged into a common mixing chamber and then dropped onto an impeller. It has been found that spreaders constructed in accordance with U.S. Pat. No. 4,609,151 tend to become clogged in the mixing chamber. Accordingly, it is an object of the present invention to provide a lawn spreader which can simultaneously spread two different materials without clogging.

SUMMARY OF THE INVENTION

The present invention is an apparatus for spreading material, including a support frame and a pair of ground engaging wheels for rollingly supporting the frame. A hopper is attached to the support frame and includes first and second isolated chambers for holding first and second materials, respectively, to be spread. A first series of discharge openings in the bottom of the first chamber allow material to be discharged from the first chamber. A second series of discharge openings in the bottom of the second chamber allow material to be discharged from the second chamber.

A series of passages interconnect the first and second series of discharge openings. Each passage has two inlets and one outlet and places the two inlets in communication with the one outlet. One of the inlets to each passage is in the first series of discharge openings and the other one of the inlets to each passage is in the second series of discharge openings. An impeller is driven for rotation by the wheels. The outlets of the passages discharge material onto the impeller. Valves are operable to selectively independently control the flow of material through the first and second series of discharge openings.

BRIEF DESCRIPTION OF THE DRAWINGS

The foregoing and other features of the present invention will become apparent to one skilled in the art to which the invention pertains upon a consideration of the following description of the invention with reference to the accompanying drawings, wherein:

FIG. 1 is a front elevational view of a spreader embodying the present invention;

FIG. 2 is a right elevational view of the spreader of FIG. 1;

DESCRIPTION OF PREFERRED EMBODIMENT

Figure 3:
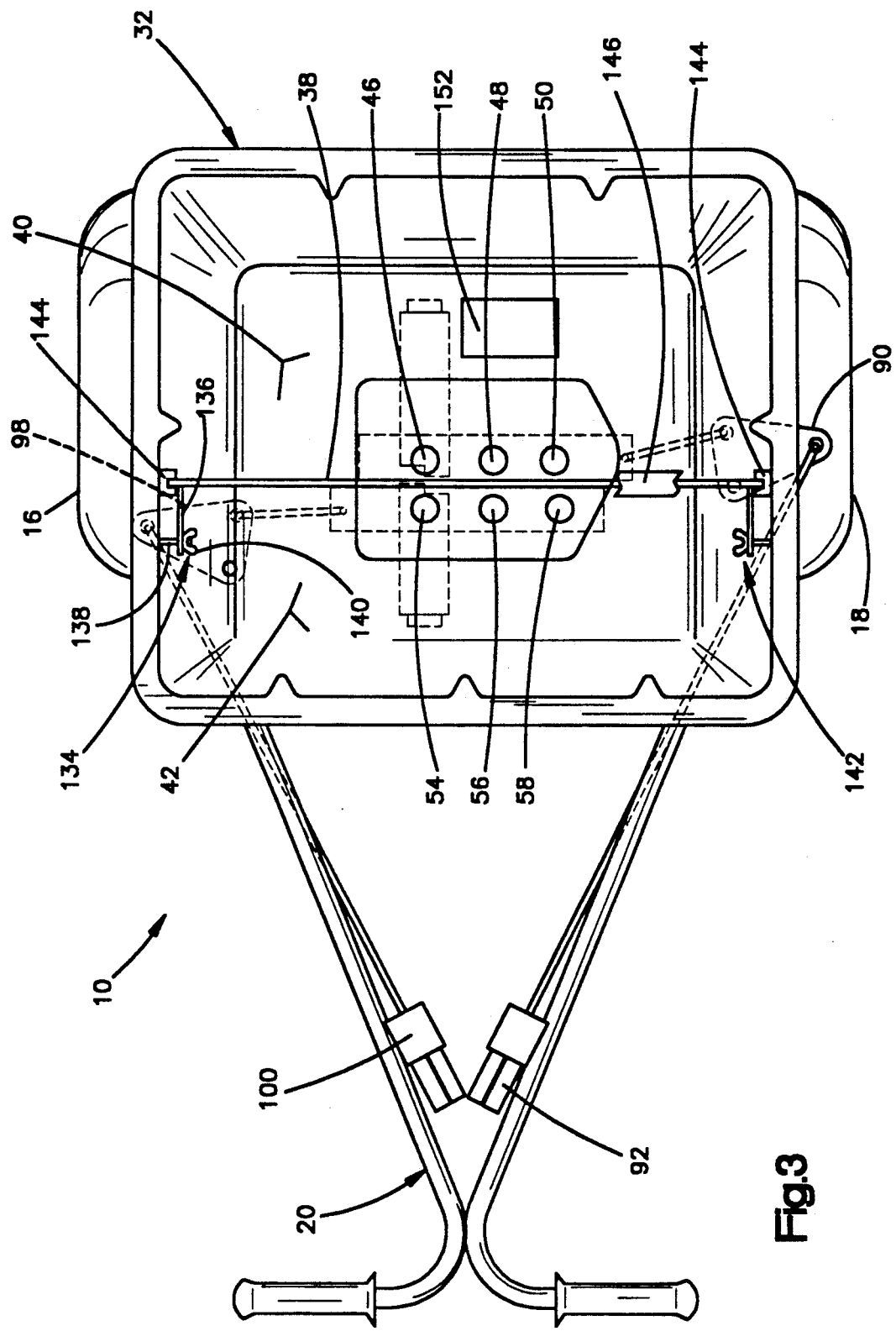
FIG. 3 is a top plan view of the spreader of FIG. 1.

The present invention relates to a material spreader, and more particularly to a spreader such as a lawn spreader which can simultaneously spread two different materials. The present invention is applicable to various spreader constructions. As representative of the present invention, FIG. 1 illustrates a spreader 10. The spreader 10 includes a support frame 12 with an axle assembly 14. A pair of ground engaging wheels 16 and 18 are supported for rotation by the axle assembly 14. The support frame 12 also includes a handle assembly 20 for manual operation of the spreader by an operator.

An impeller 22 is supported for rotation relative to the support frame 12 by a vertically extending impeller shaft 24. The impeller 22 is driven to rotate by the wheels 16 and 18, through a gear assembly 26, in a known manner. A portion 28 of the impeller 22 (FIG. 2) is disposed forward of the impeller shaft 24. A portion 30 of the impeller 22 is disposed rearward of the impeller shaft 24.

A hopper 32 is attached to the support frame 12 and is disposed above the impeller 22. The hopper 32 has a tapered, funnel-shaped upper portion 34, and a lower portion 36 with generally vertically extending walls. A baffle 38 (FIG. 3) divides the hopper upper portion 34 into a front chamber 40 and a rear chamber 42. The two chambers 40 and 42 can receive two different materials to be spread by the spreader 10. The front chamber 40 is isolated from the rear chamber 42 by the baffle 38.

In the bottom of the front chamber 40 is a first series of three circular discharge openings 46, 48, and 50. The openings 46, 48 and 50 allow material to flow downwardly out of the front chamber 40. A second series of three circular discharge openings 54, 56, and 58 is located in the bottom of the rear chamber 42. The openings 54, 56 and 58 allow material to flow downwardly out of the rear chamber 42.

A distribution assembly 60 (FIGS. 5 and 6) is secured in a chamber 61 in the lower portion 36 of the hopper 32. The distribution assembly 60 includes a stainless steel plate 62, a plastic distribution manifold 64, and a pair of stainless steel slide valves 66 and 68. The discharge openings in the bottoms of the chambers 40 and 42 are formed in the plate 62. The distribution manifold 64 is secured to the underside of the plate 62 with four screws 70. The valves 66 and 68 are slidably disposed between the plate 62 and the distribution manifold 64. Four screws 72 extend horizontally through the hopper portion 36 and through bosses 73 in the distribution manifold 64 to secure the distribution manifold 64 and thus the assembly 60 to the hopper 32.

Figure 4:
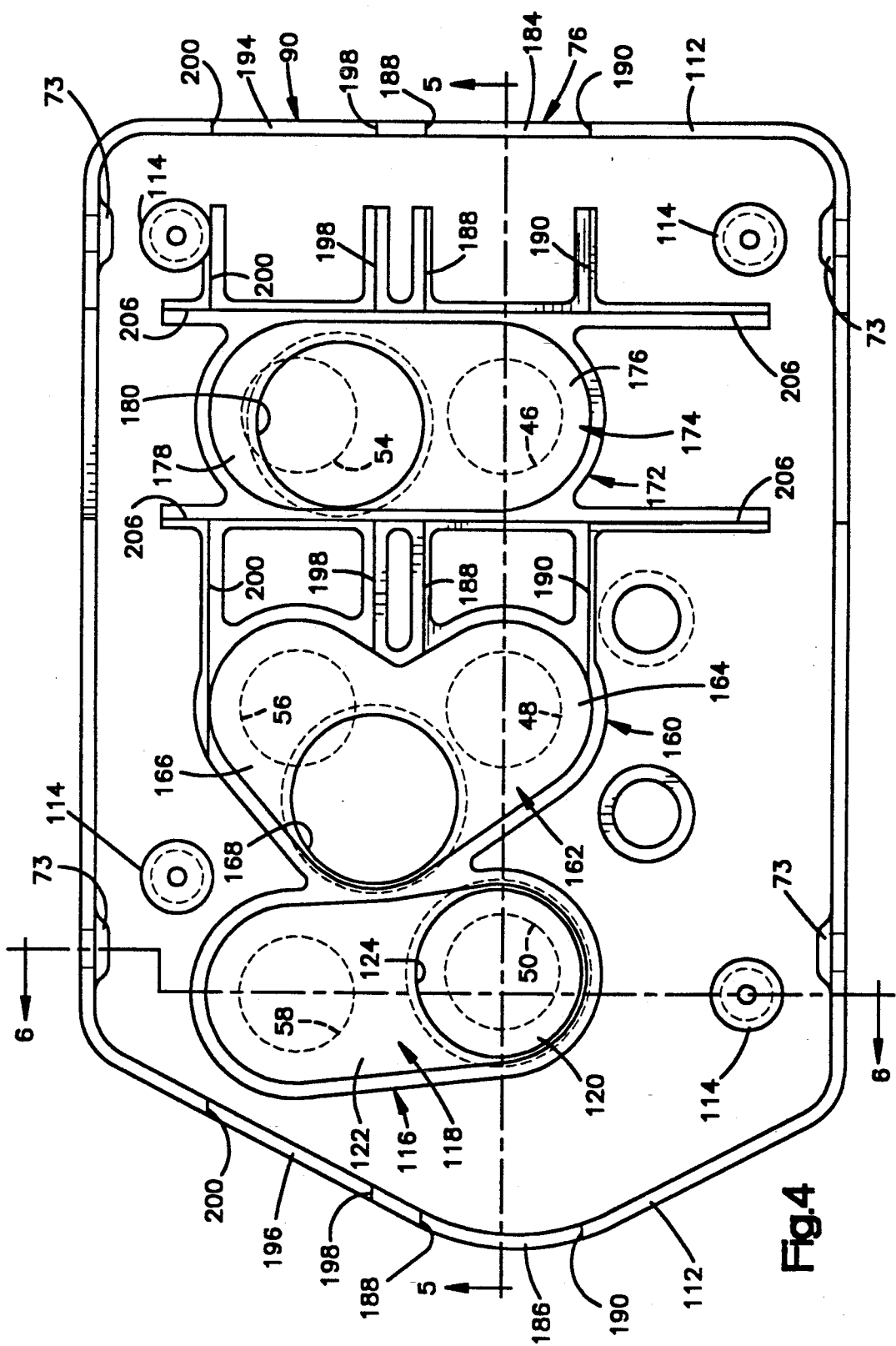
FIG. 4 is an enlarged top plan view of a distribution manifold used in the spreader of FIG. 1.
Figure 5:
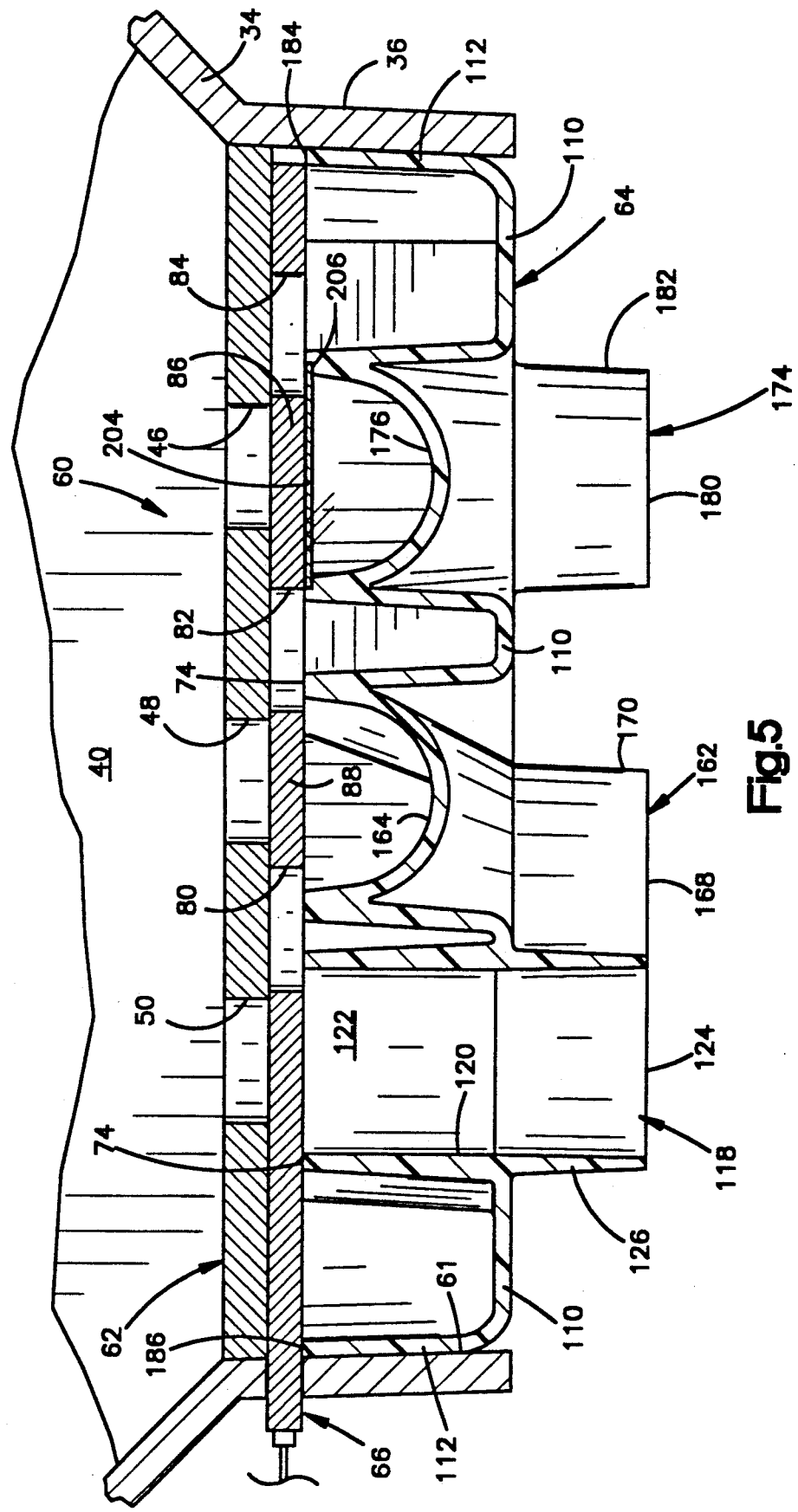
FIG. 5 is a sectional view taken along line 5—5 of FIG. 4 and showing the distribution manifold in position in the spreader.
Figure 6:
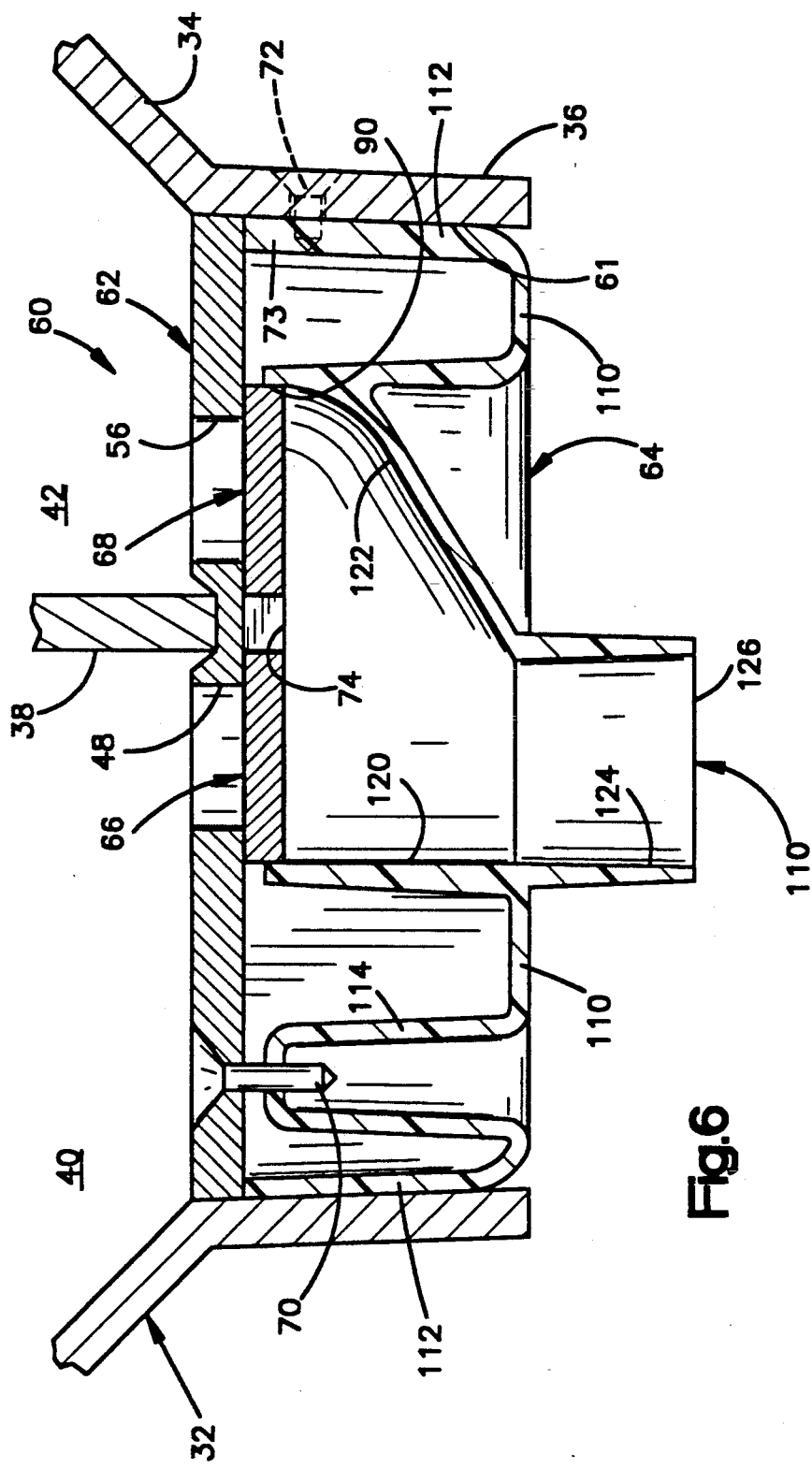
FIG. 6 is a sectional view taken along line 6—6 of FIG. 4 and showing the distribution manifold in position in the spreader.
Figure 7:
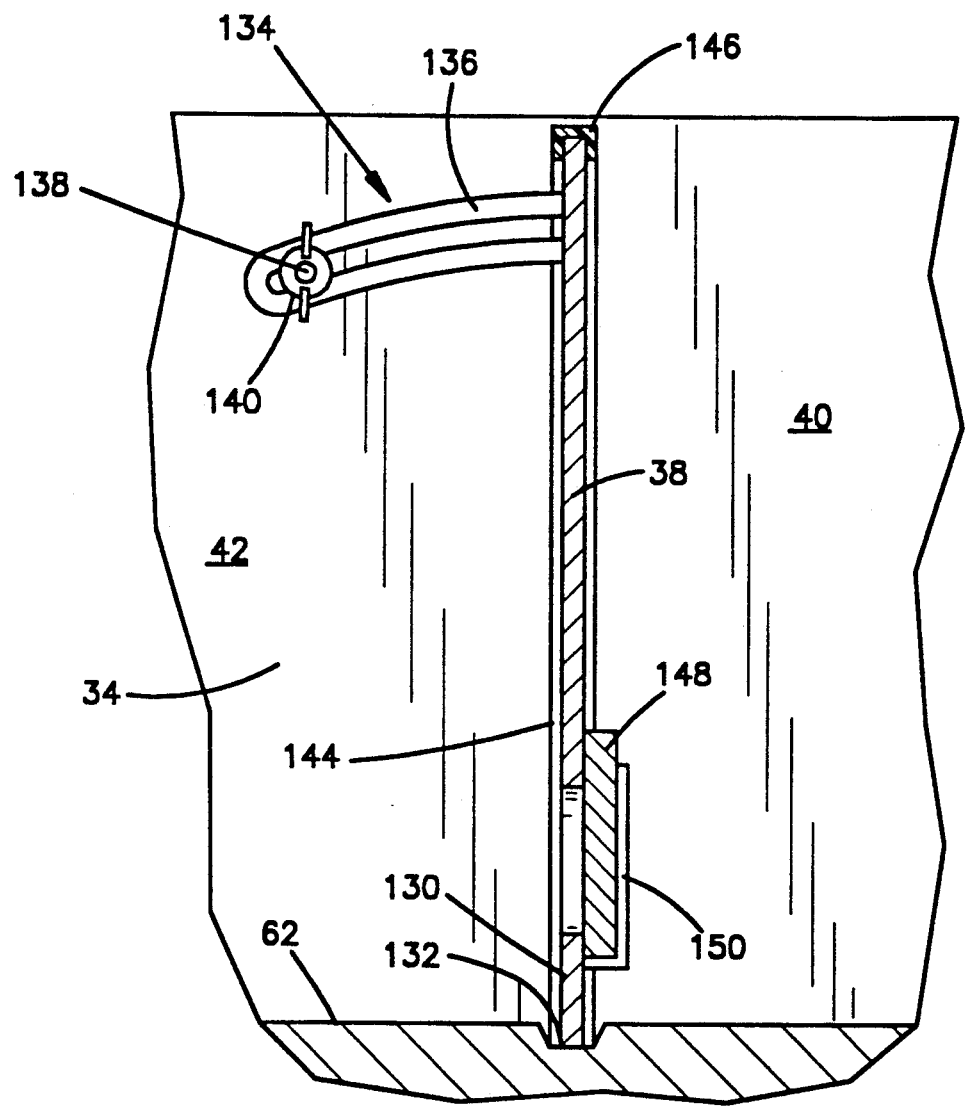
FIG. 7 is an enlarged sectional view of a portion of the spreader of FIG. 1.

The front slide valve 66 is slidable from left to right as viewed in FIGS. 4 and 5, and into and out of the plane of the paper as viewed in FIG. 6, along an upper surface 74 of the distribution manifold 64. The front slide valve 66 is disposed beneath the first series of discharge openings 46, 48 and 50 (FIGS. 3 and 5). The front slide valve 66 has three spaced openings 80, 82, and 84 (FIG. 3), with lands 86 and 88 (FIG. 5) between them. The front slide valve 66 is operated by a rod and plate linkage 90 (FIG. 3) controlled by a handle 92. Alternatively, the front slide valve 66 may be operated in a known manner by a cable connected to the handle 92.

Movement of the handle 92 by the spreader operator results in sliding movement of the front slide valve 66 to position the openings in the front slide valve relative to the discharge openings for the front chamber 40. The front slide valve 66 may be positioned to completely close the discharge openings 46, 48 and 50, as illustrated in FIGS. 3 and 5, with none of the openings in the front slide valve aligned with the discharge openings. The front slide valve 66 may also be positioned to completely open the discharge openings 46, 48 and 50, by aligning the openings in the front slide valve with the discharge openings. The front slide valve 66 may also be positioned to partially open the discharge openings 46, 48 and 50 by aligning the openings in the front slide valve partially, to any desired extent, with the discharge openings. Thus, the spreader operator may establish the desired flow rate of material out of the front chamber 40, from none to full open, by suitable operation of the front slide valve 66.

The rear slide valve 68 is slidable parallel to the front slide valve 66 along the upper surface 74 of the distribution manifold 64. The rear slide valve 68 controls the flow of material out of the rear chamber 42 of the hopper 32. The rear slide valve 68 is disposed below the second series of discharge openings 54, 56 and 58 (FIG. 3).

The rear slide valve 68 has three spaced openings similar to openings 80, 82 and 84 in slide valve 66. The opening can be aligned selectively with the discharge openings 54, 56 and 58. The rear slide valve 68 is operated by a rod and plate linkage 98 (FIG. 3) controlled by a handle 100. Movement of the handle 100 by the spreader operator results in sliding movement of the rear slide valve 68 relative to the discharge openings 54, 56 and 58, to control flow of material from the rear hopper chamber 42. The rear slide valve 68 may be positioned to completely block flow of material out of the chamber 42, to completely open the discharge openings, or at any position in between. Thus, the spreader operator may, by suitable operation of the rear slide valve 68, establish the desired flow rate of material out of the rear chamber 42, ranging from none to full open. The flow of material from the chamber 42 can be controlled independently of the flow of material from the chamber 40.

The material passing through the openings in the plate 62 and in the slide valves 66 and 68 flows downwardly into the distribution manifold 64. The distribution manifold 64 is preferably a single piece of molded plastic material having a generally planar main body portion 110 extending horizontally for the entire extent of the distribution manifold 64. A rim 112 extends upward from the main body portion 110 around the outer perimeter of the center portion. Four mounting bosses 114 also project upward from the main body portion 110 and receive the screws 70 for attaching the plate 64 to the distribution manifold 64.

The distribution manifold 64 includes a plurality of walls projecting upward and downward from the main body portion 110 which define three material flow passages 118, 162, and 174 extending from top to bottom through the distribution manifold 64. The three Y-shaped passages 118, 162, and 174 in the distribution manifold 64 interconnect the first and second series of discharge openings. Each of the passages 118, 162, and 174 is isolated from the other passages to block material flow between the various passages.

An oval-shaped first wall 116 (FIG. 4) projects upward from the main body portion 110 and partially defines a first material flow passage 118 extending vertically through the distribution manifold 64. A first inlet portion 120 of the passage 118 is aligned below the discharge opening 50 from the front chamber 40 of the hopper 32. A second inlet portion 122 of the passage 118 is aligned below the discharge opening 58 from the rear chamber 42 of the hopper 32. An outlet portion 124 (FIGS. 4-6) of the first flow passage 118 is defined by an outlet wall or chute 126 extending downward from the main body portion 110. The outlet portion 124 of the passage 118 joins the inlet portions 120 and 122 and allows material to flow out the bottom of the distribution manifold 64 via the outlet chute 126.

A second wall 160, which is heart-shaped as viewed from the left in FIG. 4, extends upward from the main body portion 110 of the distribution manifold 64 and partially defines a second material flow passage 162 extending vertically through the distribution manifold 64. A first inlet portion 164 of the passage 162 is aligned below the discharge opening 48 from the front chamber 40 of the hopper 32. A second inlet portion 166 of the passage 162 is aligned below the discharge opening 56 from the rear chamber 42 of the hopper 32. The second passage 162 also has an outlet portion 168 defined by an outlet wall or chute 170 extending below the main body portion 110. The outlet portion 168 of the second material flow passage 160 joins the inlet portions 164 and 166 and allows material to flow out the bottom of the distribution manifold 64 via the outlet chute 170.

An oval-shaped third wall 172 extends upwardly from the main body portion 110 and partially defines a third material flow passage 174 extending vertically through the distribution manifold 64. The third passage 174 includes a first inlet portion 176 aligned below the discharge opening 46 from the front chamber 40 of the hopper 32. A second inlet portion 178 of the third passage 174 is aligned below the discharge opening 54 from the rear chamber 42 of the hopper 32. An outlet portion 180 of the third passage 174 is defined by an outlet wall or chute 182 extending downward from the main body portion 110. The outlet portion 180 of the third material flow passage 174 joins the inlet portions 176 and 178 and allows material to flow out the bottom of the distribution manifold 64 via the outlet chute 182.

The distribution manifold 64 also includes upward projecting wall portions having upper surfaces defining grooves in which the slide valves 66 and 68 slide. Specifically, the bottom of a groove 76 for the front slide valve 66 is defined by a horizontal surface 184 (FIGS. 4 and 5) recessed in the rim 112 at one end of the distribution block 64, a horizontal surface 186 recessed in the rim at the opposite end of the distribution block 64, and upper horizontally extending surfaces of wall portions between them. The vertical sides of the groove 76 are defined by a series of inner edge surfaces 188 and a series of outer edge surfaces 190 which extend vertically upwardly from the bottom of the groove 76.

The bottom of a groove 90 in which the rear slide valve 68 slides is defined by a horizontal surface 194 recessed in the rim 112 at one end of the distribution manifold 64, a horizontal surface 196 recessed in the rim 112 at the opposite end of the distribution manifold 64, and upper horizontal surfaces of wall portions of the distribution manifold 64 between them. The vertical sides of the rear slide valve groove 90 are defined by a series of vertically extending inner edge surfaces 198 and a series of vertically extending outer edge surfaces 200 formed in the distribution manifold 64.

The outlet chutes 126, 170, and 182 (FIG. 5) are preferably disposed toward the rear of the distribution manifold 64 and over the rearward portion 30 of the impeller 22. This helps to provide an even distribution of the material being spread. The outlet chutes 126, 170, and 182 also preferably discharge the majority of the material to be spread on one side of the impeller 22 rather than directly centered left to right. This also helps to provide an even distribution of material. The outlet chutes 126, 170 and 182 are disposed on the distribution manifold 64 such that the material is directed onto the rear portion 30 of the impeller 20 at locations which are spaced apart from each other and spaced laterally on the impeller 20 toward the left and right of the shaft 24.

A secondary slide valve 204 is slidable front to back along a secondary slide groove 206 formed in the distribution manifold 64, below the slide valves 66 and 68. The secondary slide valve 204 is manually actuated to open and close the third material flow passage 174. The secondary slide valve 204 may be closed to allow material to be spread only to one lateral side of the path of forward movement of the spreader 10, or may be opened to allow material to be spread on both sides of the path of forward movement of the spreader 10.

If the slide valves 66 and 68 are set so that material from only one chamber 40 or 42 is discharged, that material flows downwardly through the distribution manifold 64. If materials from both chambers 40 and 42 is discharged, the two materials flow together within the passages 118, 162, and 174. The overall flow of material out of the spreader 10 may be controlled by a gate valve (not shown) or other control means which may be of a known construction. For each passage 118, 162, and 174, the combined inlet area of the two discharge openings into that passage is preferably less than the outlet area of the outlet portion of that passage. This difference in size between the inlets and the outlets prevents the material flowing downwardly out of the chambers 40 and 42 from clogging in the passages 118, 162, and 174.

The baffle 38 is movable in the hopper 32 to vary the relative sizes of the front chamber 40 and rear chamber 42. A lower end portion 130 (FIG. 8) of the baffle 38 is received in a notch 132 in the plate 62. An adjuster 134 at one end of the baffle 38 is used to set the position of the baffle 38 in the hopper 32. The adjuster 134 includes a slotted arm 136 attached to the baffle 38. A threaded stud 138 extends inwardly through an opening in the hopper wall 34 and through the slotted arm 136. A wing nut or other suitable fastener 140 is threadedly received on the stud 138.

The wing nut 140 is loosened to allow the slotted arm 136 and baffle 38 to move relative to the stud 138. The baffle 38 pivots about its lower end portion 130. The wing nut 140 is tightened on the stud 138 to fix the slotted arm 136 and baffle 38 in position relative to the stud 138 and thus in position relative to the hopper wall 34. A similar adjuster 142 is located at the opposite end of the baffle 38. Use of the adjusters 134 and 142 in this manner controls the relative sizes of the front chamber 40 and rear chamber 42.

The vertically extending edges of the baffle 38 are covered with pliable plastic seals 144. The seals 144 engage the hopper wall and block intermixing of the materials in the front and rear chambers 40 and 42, respectively, of the hopper 32. To prevent operator contact with the upper edge of the baffle 38, which may be of metal, a similar plastic member 146 covers the upper edge of the baffle 38.

A sliding panel 148 in the lower portion of the baffle 38 allows transfer or dumping of material from the rear chamber 42 into the front chamber 40. The panel 148 is slidable in a track 150 attached to the baffle 38. Similarly, a sliding panel 152 (FIGS. 1-3) in the front of the hopper lower portion 36 allows for emptying of material from the front chamber 40 of the hopper 32 to the outside. Thus, both chambers 40 and 42 can be emptied without inverting the spreader 10.

From the above description of the invention, those skilled in the art will perceive improvements, changes and modifications in the invention. Such improvements, changes and modifications within the skill of the art are intended to be covered by the appended claims.

I claim:

1. Apparatus for spreading material, comprising:

a support frame and a pair of ground engaging wheels for rollingly supporting said frame on the ground;

a hopper attached to said support frame and including first and second isolated chambers for holding first and second materials, respectively, to be spread;

a first series of discharge openings in the bottom of said first chamber to allow material to be discharged from said first chamber;

a second series of discharge openings in the bottom of said second chamber to allow material to be discharged from said second chamber;

an impeller driven for rotation by said wheels for distributing the material to be spread;

means for directing material from said first and second chambers onto said impeller, said means consisting of a series of passages interconnecting said first and second series of discharge openings, each passage having two inlets and one outlet and portions placing said two inlets in communication with said one outlet, one of said two inlets to each passage being in said first series of discharge openings and the other one of said two inlets to each passage being in said second series of discharge openings and wherein each of said passages is isolated from the other passages, and said outlets of said passages discharging the flowing material directly out and on spaced apart portions of a surface of said impeller; and means mounting said impeller below said outlets and aligned with said outlets to receive material on said spaced apart portions of said surface of said impeller.

2. Apparatus as defined in claim 1 comprising valve means for selectively independently controlling the flow of material through said first and second series of discharge openings.

3. Apparatus as defined in claim 1 wherein for each one of said series of passages the combined area of said two inlets is less than the area of said outlet.

4. Apparatus as defined in claim 1 wherein each of said passages is Y-shaped and includes two upper portions and a lower portion, said upper portions communicating with said inlets of said passage, each respective upper portion receiving material from a respective one of said chambers, said lower portion placing said upper portions in fluid communication and receiving material from said upper portions and communicating material to said outlet of said passage.

5. Apparatus as defined in claim 1 wherein said outlets discharge material onto said surface of said impeller at a location spaced laterally relative to the apparatus from the center of said impeller.

6. Apparatus as defined in claim 1 wherein said means defining a series of passages comprises a distribution manifold attached to said support frame for receiving and flowing together material discharged from said first and second chambers through said first and second series of discharge openings.

7. Apparatus as defined in claim 6 wherein said hopper has wall means disposed below said first and second chambers for defining a third chamber below said discharge openings, said distribution manifold being disposed within said third chamber and secured to said wall means.

8. Apparatus as defined in claim 1 wherein said outlets discharge material onto a rearward portion of said surface of said impeller at a location spaced laterally relative to the apparatus from the center of said impeller.

9. Apparats as defined in claim 1 further including a handle located at one side of said hopper for manual force to be applied thereto to move the apparatus along the ground, and said means mounting said impeller locating said impeller with the axis of rotation of the impeller spaced apart from said discharge outlets in a direction away from said handle, said discharge outlets discharging material from said passages onto said spaced apart portions of said surface of said impeller at a location between said axis of rotation and said handle.

10. Apparatus for spreading material, comprising:
a support frame and a pair of ground engaging wheels for rollingly supporting said frame on the ground;
a hopper attached to said support frame and including first and second isolated chambers for holding first and second materials, respectively, to be spread, said first and second isolated chambers being in part defined by a movable wall including a seal member on said movable wall and engaging said hopper for distribution manifolding flow of materials between said first and second chambers;
means supporting said movable wall for movement to vary the volume of said first and second chambers;
means for securing said movable wall in a plurality of positions;
a first series of discharge openings in the bottom of said first chamber to allow material to be discharged from said first chamber;
a second series of discharge openings in the bottom of said second chamber to allow material to be discharged from said second chamber; and
a rotatable impeller for receiving material from said first and second series of openings and for distributing the material.

11. The apparatus as defined in claim 10 comprising a means defining a series of passages interconnecting said first and second series of discharge openings, each passage having two inlets and one outlet and placing said two inlets in communication with said one outlet, one of said inlets to each passage being in said first series of discharge openings and the other one of said inlets to each passage being in said second series of discharge openings; and
an impeller driven for rotation by said wheels for distributing the material to be spread, said outlets of said passages discharging material on spaced apart portion of surface of said impeller.

12. The apparatus as defined in claim 11 wherein for each one of said series of passages the combined area of said two inlets is less than the area of said outlet.

13. The apparatus as defined in claim 11 wherein each of said passages is Y-shaped and includes two upper portions and a lower portion, said upper portions communicating with said inlets of said passage, each respective upper portion receiving material from a respective one of said chambers, said lower portion placing said upper portions in fluid communication and receiving material from said upper portions and communicating material to said outlet of said passage.

14. The apparatus as defined in claim 1 wherein each said passage is isolated from the other passages.

15. The apparatus as defined in claim 11 wherein said outlets discharge material from said passages onto a rearward portion of said impeller.

16. The apparatus as defined in claim 11 wherein said outlets discharge material onto said impeller at a location spaced laterally from the center of said impeller.

17. The apparatus as defined in claim 11 wherein said means defining a series of passages comprises a distribution manifold attached to said support frame for receiving and flowing together material discharged from said first and second chambers through said first and second series of discharge openings.

18. The apparatus as defined in claim 17 wherein said hopper has wall means disposed below said first and second chambers for defining a third chamber below said discharge openings, said distribution manifold being disposed within said third chamber and secured to said wall means.

19. The apparatus as defined in claim 10 comprising valve means for selectively independently controlling the flow of material through said first and second series of discharge openings.

* * * * *